United States Patent
Kuo et al.

(10) Patent No.: US 8,169,459 B2
(45) Date of Patent: May 1, 2012

(54) COMPENSATION METHOD IN RADIAL DIRECTION ON LABEL SIDE OF OPTICAL DISC

(75) Inventors: Chi-Hsiang Kuo, Taoyuan County (TW); Chun-Wen Lai, Taoyuan County (TW); Shih-Jung Huang, Taoyuan County (TW)

(73) Assignee: Quanta Storage Inc., Taoyuan County (TW)

( * ) Notice: Subject to any disclaimer, the term of this patent is extended or adjusted under 35 U.S.C. 154(b) by 0 days.

(21) Appl. No.: 12/980,230

(22) Filed: Dec. 28, 2010

(65) Prior Publication Data
US 2011/0228655 A1  Sep. 22, 2011

(30) Foreign Application Priority Data
Mar. 18, 2010 (TW) .............................. 99108097 A (51) Int. Cl.
*G11B 19/12* (2006.01)
*G11B 7/0037* (2006.01)
*B31J 2/435* (2006.01)

(52) U.S. Cl. .................. 347/262; 347/242; 369/44.25

(58) Field of Classification Search ............... 369/44.25; 347/262, 224
See application file for complete search history.

(56) References Cited

U.S. PATENT DOCUMENTS

| 7,116,607 B2 * | 10/2006 | Lee et al. ................ 369/30.16 |
| 7,414,643 B2 * | 8/2008 | Bahng ........................ 347/224 |
| 7,656,758 B2 * | 2/2010 | Akkermans ............... 369/44.28 |

* cited by examiner

*Primary Examiner* — Aristotelis Psitos
(74) *Attorney, Agent, or Firm* — Rabin & Berdo, P.C.

(57) ABSTRACT

The disclosure discloses a compensation method in a radial direction on a label side of an optical disc. An optical disc is inserted into an optical disk drive. The data side of the optical disc is divided into at least one compensation area. An optical pick-up head (OPU) is moved from inner to outer rings by simulating a writing process. The OPU is moved to some pre-determined points and radial-directional compensation is performed to obtain radial-directional voltage gains at the pre-determined points. The voltage gains are recorded. The label side of an optical disc is inserted into the optical disk drive. The simulated track number is calculated on the basis of the required moving distance for the OPU to write pattern on the label side. The OPU is moved to write the label side by a radial-directional lens driving voltage compensated with a gain obtained from a compensation formula.

9 Claims, 7 Drawing Sheets

COMPENSATION METHOD IN RADIAL DIRECTION ON LABEL SIDE OF OPTICAL DISC

This application claims the benefit of Taiwan application Serial No. 99108097, filed Mar. 18, 2010, the subject matter of which is incorporated herein by reference.

BACKGROUND

1. Technical Field

The disclosure relates in general to a light scribe disc drive, and more particularly to a compensation method which compensates the voltage for moving the optical pick-up head of the light scribe disc drive to write a pattern in the radial direction on the label side of an optical disc.

2. Description of the Related Art

In general, an optical disc has two sides, namely, the data side and the label side. The data side is for storing the data written with an optical pick-up head, and the label side is for marking the contents of the data stored in the optical disc through the use of a sticker or a pen. Currently, a specific optical disc is provided. With the specific dye being coated on the label side and the use of specific light scribe disc drive and writing program, desired patterns and texts can be easily written on the label side, making the optical disc more versatile and personalized.

Figure 1:
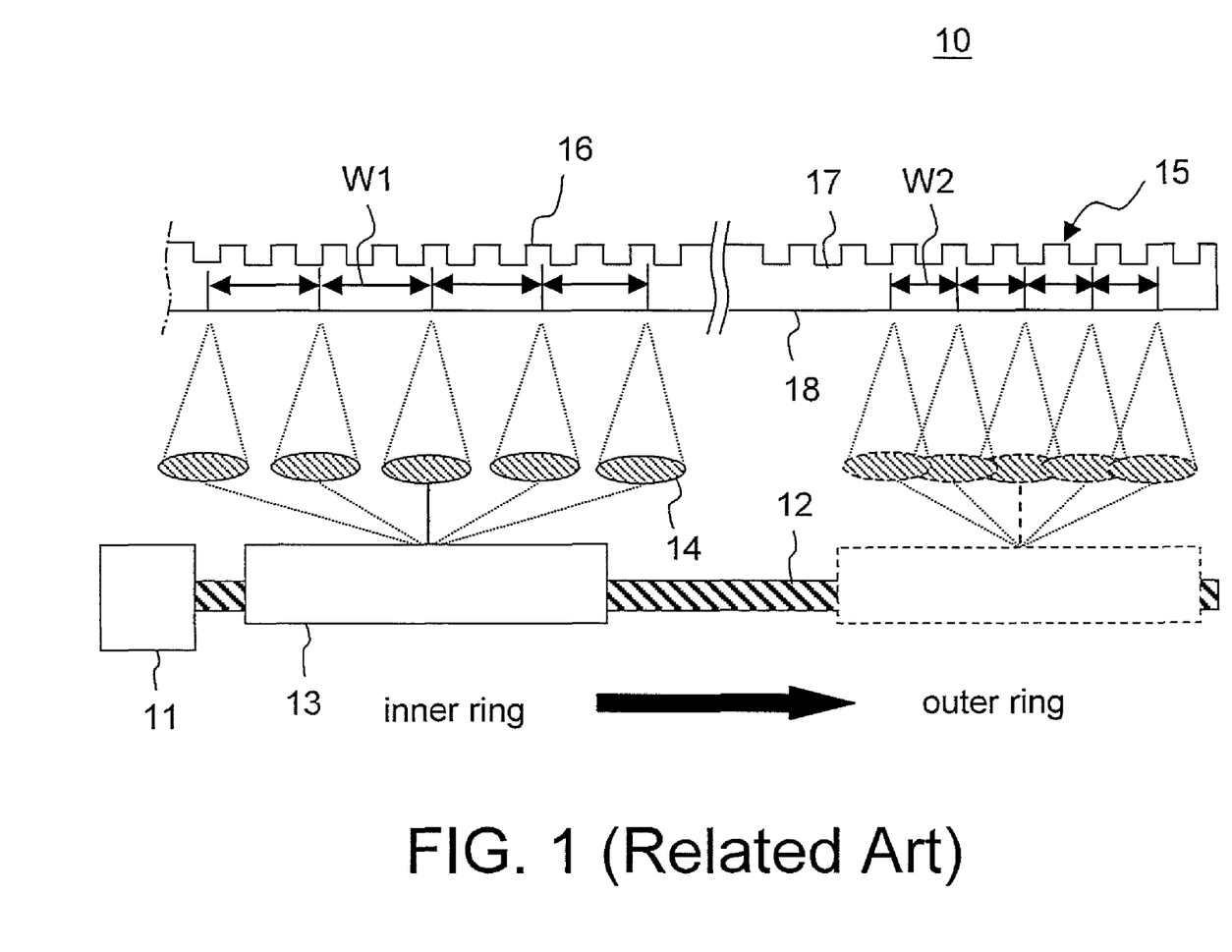
FIG. 1 shows a light scribe disc drive writing an optical disc according to related arts.

As indicated in FIG. 1, a light scribe disc drive writing an optical disc according to related arts is shown. During the writing process, the light scribe disc drive 10 rotates a lead screw 12 with a step motor 11 for moving an optical pick-up head (OPU) 13 to a fixed point in the manner of coarse adjustment first. Then, a voltage generates a corresponding electromagnetic force which drives the lens 14 to displace within the track field covered by the fixed point in the manner of fine adjustment, and the writing of the optical disc 15 is done through focusing and tracking. After the writing on the track field of a fixed point is completed, the OPU 13 is displaced to the track field of the next fixed point in the manner of coarse adjustment, the lens 14 is displaced in the manner of fine adjustment, and the writing on the track field is repeated to complete the writing of the optical disc.

However, in actual practice, the fine adjustment in the displacement of the lens 14 may not be done precisely through the use of a driving voltage due to the factors such as the temperature, voltage and mechanical tolerance of the light scribe disc drive. As indicated in FIG. 1, when the OPU 13 writes on an optical disc 15 from inner rings to outer rings, the displacement of the lens 14 driven by the same magnitude of voltage diminishes from distance W1 in inner rings to distance W2 in outer rings, and displacement offset occurs accordingly. However, such displacement offset can be compensated by marking the address of the data track 17 during the writing of the data side 16.

Since the label side 18 is lack of data track, the problem of displacement offset cannot be resolved by way of marking address when writing a pattern on the label side 18. Thus, when drawing a pattern on the label side 18, the lines are inconsistent, and the pattern cannot be written uniformly. Thus, the issue of compensating the voltage in the radial direction on the label side of an optical disc in related art still has many problems to be resolved.

SUMMARY

According to a first aspect of the present disclosure, a compensation method in the radial direction on the label side of an optical disc is disclosed. The required gain for compensating the voltage for moving the OPU can be obtained from a compensation formula, the problem of the moving distance of the OPU in inner rings and outer rings of the optical disc being inconsistent is resolved, and the writing quality of the label side is improved.

According to a second aspect of the present disclosure, a compensation method in the radial direction on the label side of an optical disc is disclosed. The optical disc is divided into a plurality of compensation areas from inner rings to outer rings, and the change in voltage gain is more accurately approximated by the gain obtained from a compensation formula for each compensation area, so as that the writing quality of the label side can be further improved.

To achieve the above aspects of the present disclosure, a compensation method in the radial direction on the label side of an optical disc is disclosed. An optical disc is inserted into an optical disk drive. The data side of the optical disc is divided into at least one compensation area. An OPU is moved from inner rings to outer rings by simulating a writing process. The OPU is moved to some pre-determined points of the compensation area and radial-directional compensation is performed to obtain radial-directional voltage gains at the pre-determined points. The voltage gains are recorded. The label side of an optical disc is inserted into the optical disk drive. The simulated track number is calculated on the basis of the required moving distance for the OPU to write the label side. The OPU is moved to write the label side of the optical disc by a radial-directional lens driving voltage, which is compensated with a voltage gain obtained from a voltage compensation formula.

According to the disclosure, the data side of the optical disc is divided into a compensation area or a plurality of compensation areas. The pre-determined points are set as the demarcating data track for each compensation area, inner-ring starting point and outer-ring terminal point. The compensation area at which the OPU moves is determined according to the track number of the pre-determined point. The voltage compensation formula for each compensation area is expressed as:

$$G_{nz} = G_{z-1} + [(G_z - G_{z-1})/(N_z - N_{z-1})] \times (nz - N_{z-1}), \text{ wherein}$$

$nz$ denotes the track number of any track of the $z^{th}$ compensation area;

$G_{nz}$ denotes the voltage gain for the $nz^{th}$ track of the $z^{th}$ compensation area;

$G_z$ and $G_{z-1}$ respectively denote the voltage gain at the pre-determined points before and after the $z^{th}$ compensation area;

$N_z$ and $N_{z-1}$ denote the track number of the pre-determined points before and after the $z^{th}$ compensation area.

The above and other aspects of the disclosure will become better understood with regard to the following detailed description of the non-limiting embodiment(s). The following description is made with reference to the accompanying drawings.

DETAILED DESCRIPTION

The details and effects of the technologies adopted in the disclosure to achieve the above aspects are disclosed in a number of preferred embodiments below with accompanying drawings.

Figure 2:
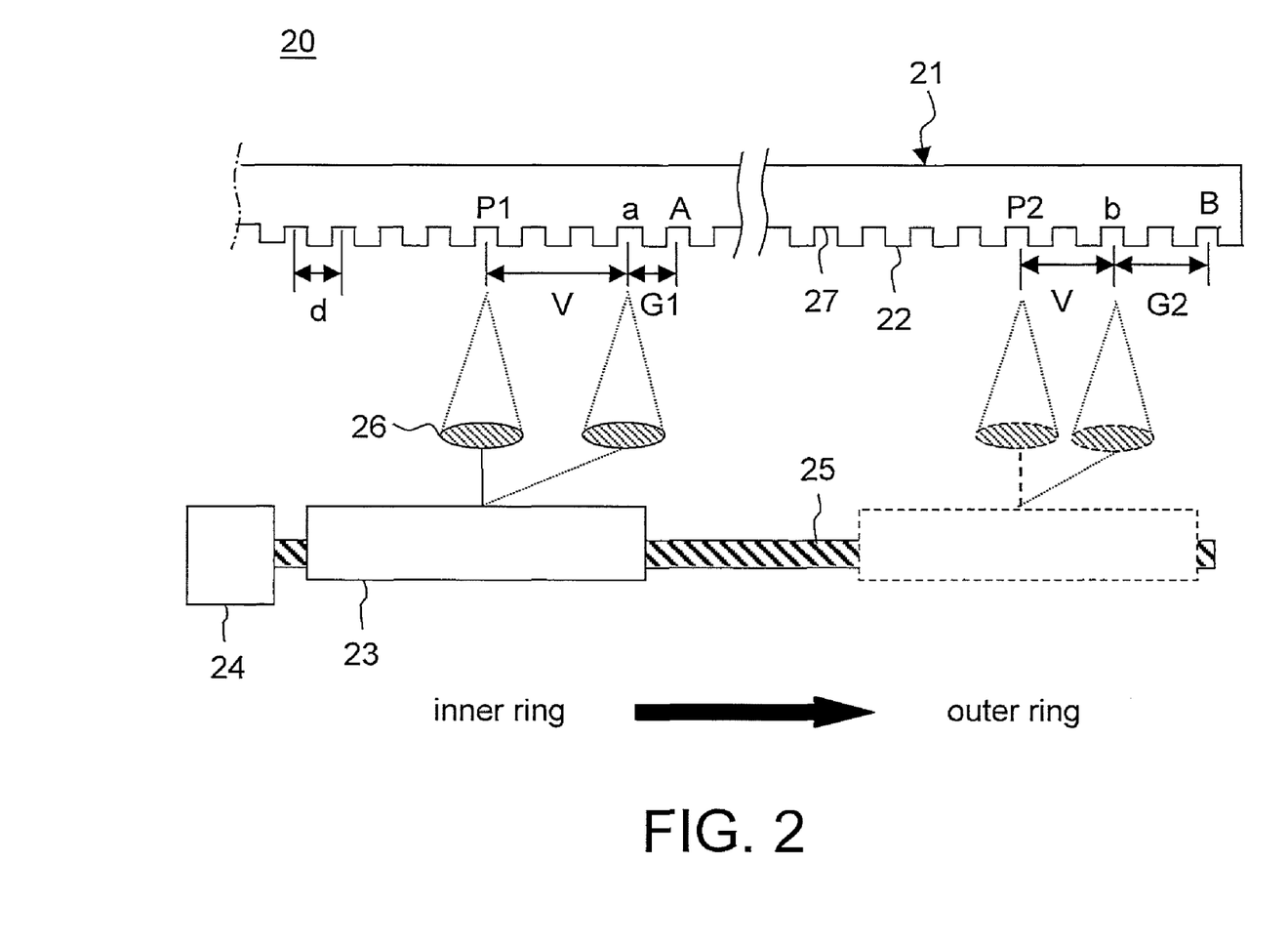
FIG. 2 shows a compensation method in the radial direction on the label side of an optical disc according to a first embodiment of the disclosure.

Referring to FIG. 2, a compensation method in the radial direction on the label side of an optical disc according to a first embodiment of the disclosure is shown. Firstly, an optical disc 21 is inserted into a light scribe disc drive 20 with the data side 22 facing an OPU 23. A lead screw 25 is rotated by a step motor 24 for coarsely adjusting and moving the OPU 23 to a pre-determined point P1 at inner rings of the optical disc 21, wherein the best position for the pre-determined point P1 is inner-ring starting point. A lens 26 is driven by a voltage V, which is a required voltage for moving the lens to a target distance A and is determined by the light scribe disc drive 20. The actual moving distance "a" of the lens 26 can be obtained by multiplying the number of tracks crossing the data track 27 with the gauge d, wherein the number of tracks crossing the data track 27 can be obtained from the address information before and after moving the lens 26 or by counting the number of tracks crossing the data track 27 in the course of movement. A comparison between the distance "a" and the target distance A indicates whether displacement offset occurs. Then, the voltage VA is adjusted, the lens 26 is moved to the target distance A, and the voltage offset ΔV1 is obtained by deducting the pre-determined voltage V from the voltage VA. Therefore, the voltage V for driving the lens 26 in the radial direction in inner rings must be compensated with a gain G1 in the radial direction to compensate the voltage offset ΔV1 so that the lens 26 can be moved to the target distance A without incurring displacement offset. The gain G1 at the pre-determined point P1 is used as an inner-ring voltage gain.

Then, to reflect the influence on the offset due to the operating environment of the light scribe disc drive 20, the OPU 23 simulates a writing process from inner rings to outer rings track by track. When the OPU 23 is moved to an outer rings pre-determined point P2, the best position for the pre-determined point P2 is outer-ring terminal point. Like the radial-directional compensation at the pre-determined point P1 as disclosed above, the lens 26 is driven to a target distance B by the pre-determined voltage V, and whether displacement offset occurs is determined according to the actual moving distance "b" of the lens 26. Then, the voltage VB is adjusted, the lens 26 is moved to the target distance B, and the voltage offset ΔV2 and the required radial-directional compensation gain G2 are obtained. The gain G2 at the pre-determined point P2 is used as an outer-ring voltage gain.

Figure 3:
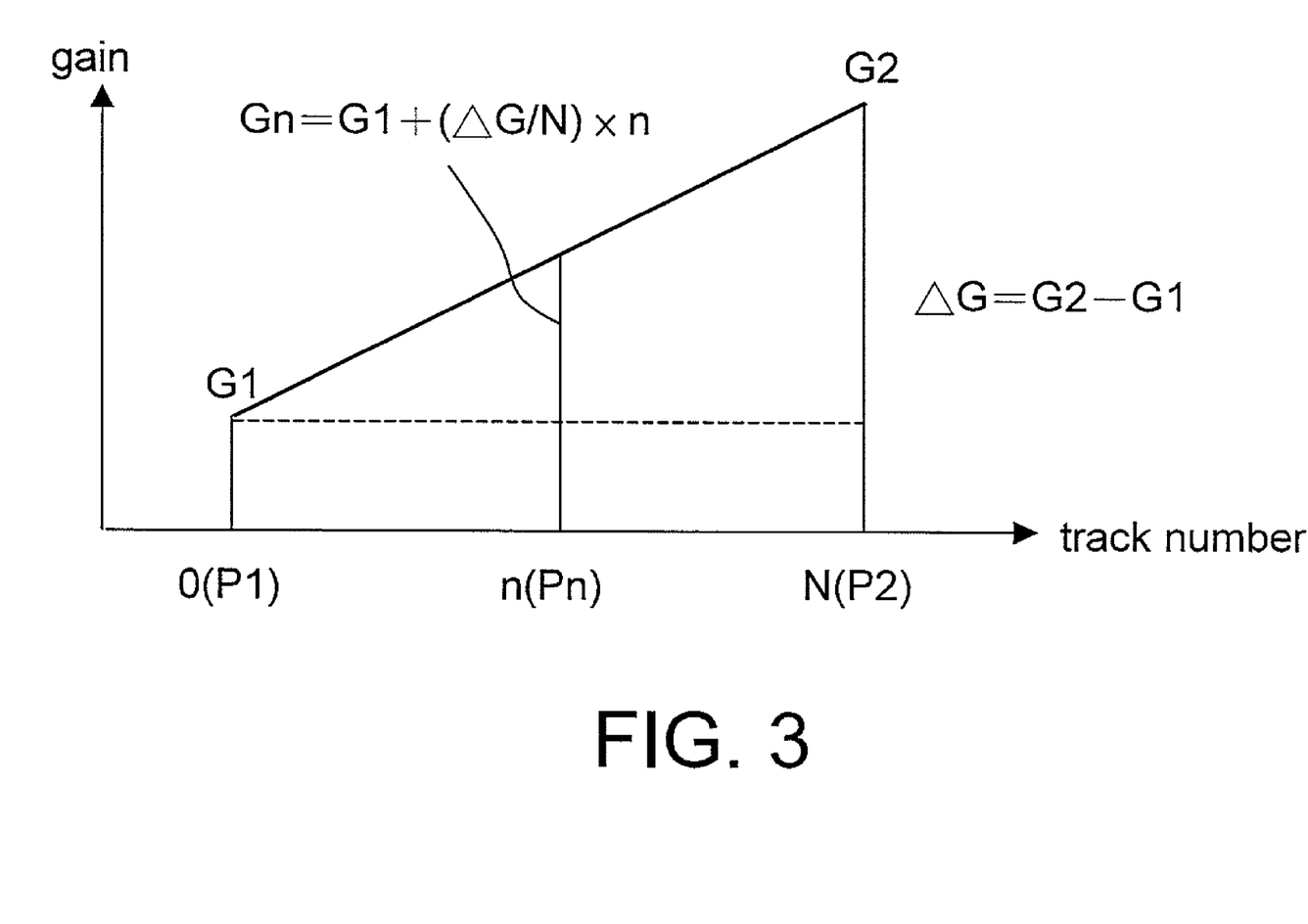
FIG. 3 shows a relationship diagram of track number vs gain in a compensation method in the radial direction on the label side of an optical disc according to a first embodiment of the disclosure.

Referring to FIG. 3, a relationship diagram of track number vs. gain in a compensation method in the radial direction on the label side of an optical disc according to a first embodiment of the disclosure is shown. The position of the pre-determined point P1 at the data track of inner-ring starting point track number 0 of the optical disc as well as the position of the pre-determined point P2 at the data track of outer-ring terminal point track number N of the optical disc are set. The voltage gain at the pre-determined point P1 is gain G1, and the voltage gain at the pre-determined point P2 is gain G2. Since the radial-directional gain for compensating the lens driving voltage gradually increases from inner rings to outer rings, the change in the gain between the pre-determined point P1 and the pre-determined point P2 is simulated through linear approximation. If the OPU is moved for a distance to the data track of any track number n, a voltage gain Gn needs to be applied to compensate the lens driving voltage for the OPU to achieve the target distance. The voltage gain Gn can be obtained from the compensation formula expressed as:

$$Gn = G1 + (\Delta G/N) \times n, \text{ wherein } \Delta G = G2 - G1$$

Thus, the gain for compensating the lens driving voltage at any point can be obtained for precisely moving the OPU to the target distance.

The label side of the optical disc is lack of data track, so that the above voltage compensation formula $Gn=G1+(\Delta G/N)\times n$ cannot be directly applied thereto. Therefore, the track number n of the data track corresponding to the point Pn can be obtained by dividing the distance of a point Pn by the gauge of the data side, wherein the OPU is driven to the point Pn in the radial direction on the label side by a step motor. The voltage compensation formula, that is, $Gn=G1+(\Delta G/N)\times n$, actually tested on the data side of the optical disc can be used in the label side of the optical disc to compensate the radial-directional lens driving voltage, so that the OPU can be precisely moved in inner and outer rings of the label side, and the lines for drawing pattern are even more uniform.

Figure 4:
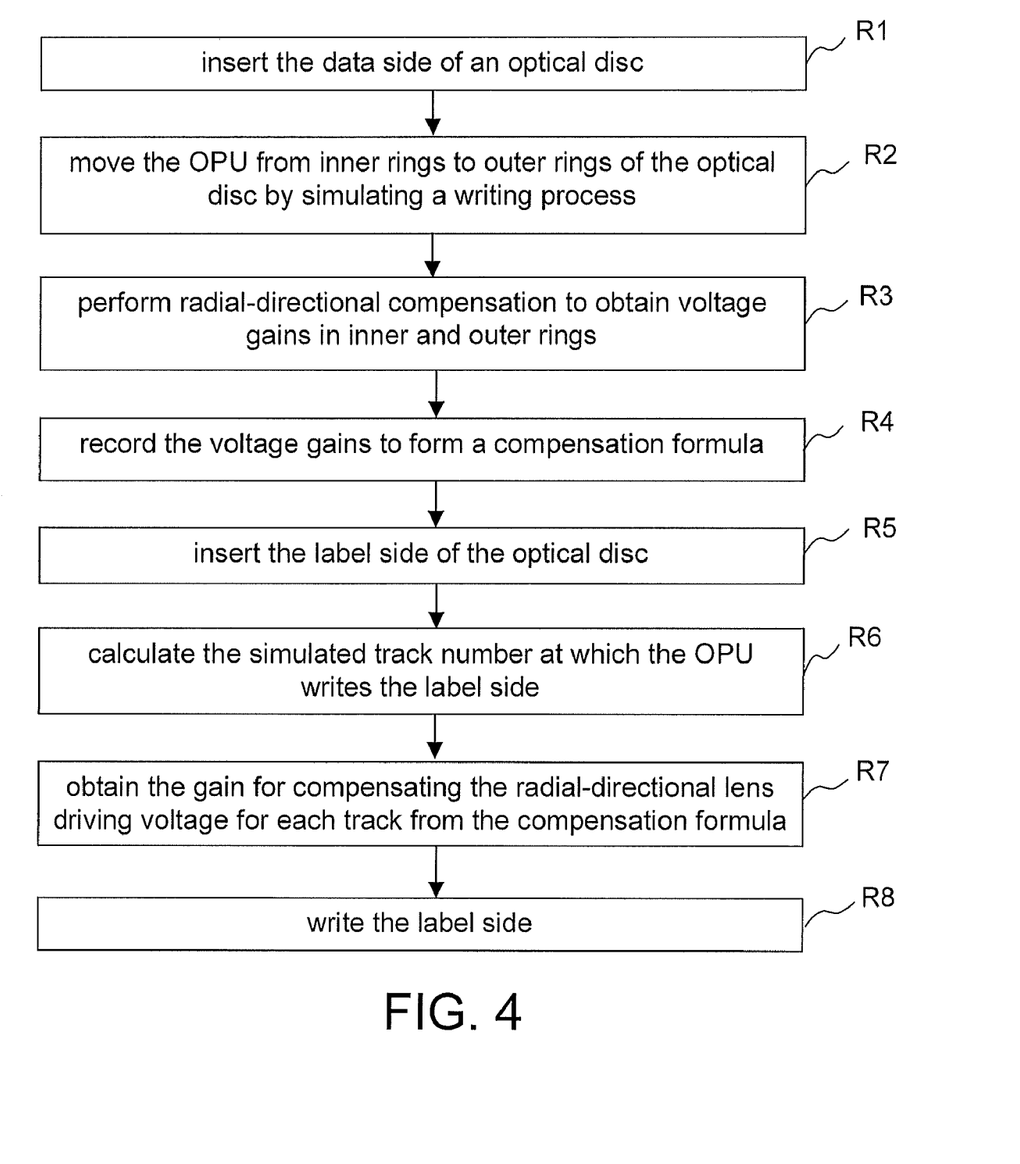
FIG. 4 shows a flowchart of a compensation method in the radial direction on the label side of an optical disc according to a first embodiment of the disclosure.

Referring to FIG. 4, a flowchart of a compensation method in the radial direction on the label side of an optical disc according to a first embodiment of the disclosure is shown. In the disclosure, the voltage for driving lens in the radial direction on the label side is compensated by a voltage compensation formula obtained from the data side, and the detailed steps are disclosed below: Firstly, the method begins at step R1, an optical disc is inserted into a light scribe disc drive with the data side of the optical disc facing an OPU. Next, the method proceeds to step R2, the OPU is moved from inner rings to outer rings sequentially by simulating a writing process. Then, the method proceeds to step R3, when the OPU is moved in inner rings, radial-directional compensation is performed to obtain a gain G1 for the lens driving voltage in inner rings, and when the OPU is moved in outer rings, radial-directional compensation is performed to obtain a gain G2 for the lens driving voltage in outer rings. After that, the method proceeds to step R4, the voltage gains for inner rings and outer rings are recoded to form a compensation formula for the lens driving voltage, wherein the compensation formula is expressed as: $Gn=G1+(\Delta G/N)\times n$. Afterwards, the method proceeds to step R5, an optical disc is inserted into the optical disk drive with the label side of the optical disc facing the OPU. Following that, the method proceeds to step R6, the simulated track number is calculated on the basis of the required moving distance for the OPU to write pattern on the label side. Then, the method proceeds to step R7, the voltage gain Gn for compensating the radial-directional lens driving voltage is obtained according to the simulated track number calculated on the basis of the moving distance required by the OPU, so that the OPU can be correctly moved to write the label side, wherein the voltage compensation formula is expressed as: $Gn=G1+(\Delta G/N)\times n$. Lastly, the method proceeds to step R8, the label side is written.

According to compensation method in the radial direction on the label side of an optical disc of the disclosure, the required gain for compensating the voltage for moving the OPU can be obtained from a compensation formula, the displacement offset between the tracks of the label side is simulated and uniformly distributed, the problem of the moving distance of the OPU in inner and outer rings of the optical disc being inconsistent is resolved, and the writing quality of the label side is improved.

Figure 5:
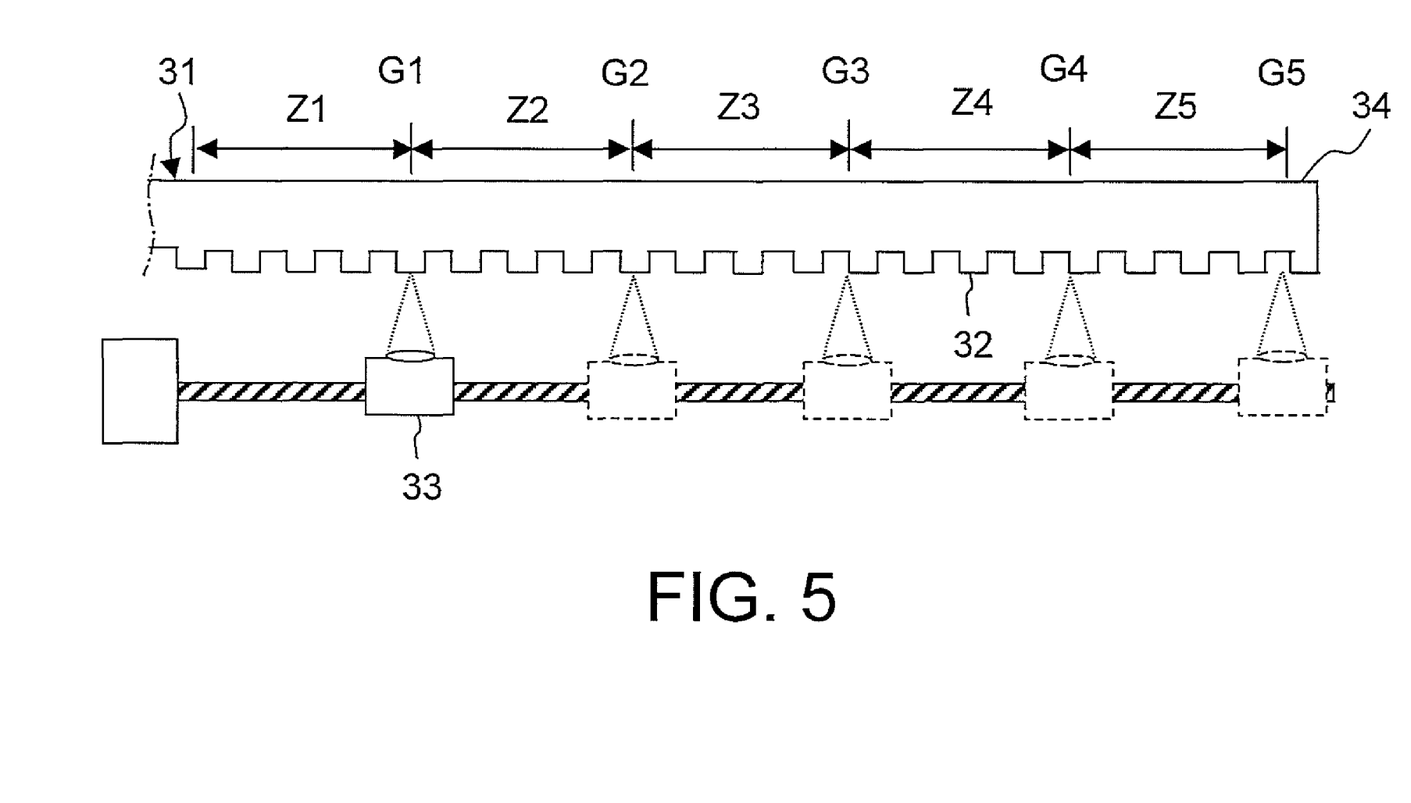
FIG. 5 shows a compensation method in the radial direction on the label side of an optical disc according to a second embodiment of the disclosure.

Referring to FIG. 5, a compensation method in the radial direction on the label side of an optical disc according to a second embodiment of the disclosure is shown. In the above embodiment, the change in the voltage gain for driving the lens in inner and outer rings of the optical disc is simulated by linear approximation. Since the radial-directional voltage gain does not increase linearly from inner rings to outer rings of the optical disc, the change in the voltage gain can be more accurately approximated if the voltage gain can be divided into a plurality of segments of linear approximation. In the second embodiment of the disclosure, the data side 32 of the optical disc 31 is divided into z compensation areas from inner rings to outer rings sequentially so that the OPU can be moved to draw pattern with higher accuracy. In the present embodiment of the disclosure, the data side 32 of the optical disc 31 is divided into 5 compensation areas, namely, the $1^{st}$ to the $5^{th}$ compensation areas. The OPU 33 simulates the writing from inner rings to outer rings track by track. In the demarcating data track for each compensation area, like the radial-directional compensation performed in the first embodiment of the disclosure, the voltage gain is set as 0 for the track number 0 of the starting point of the 1st compensation area, radial-directional compensation is performed at the demarcating data track for each compensation area and at a pre-determined point of the last track respectively to obtain the voltage gains G1, G2, G3, G4 and G5, and the voltage gains as well as the track numbers of the pre-determined points are recorded.

Figure 6:
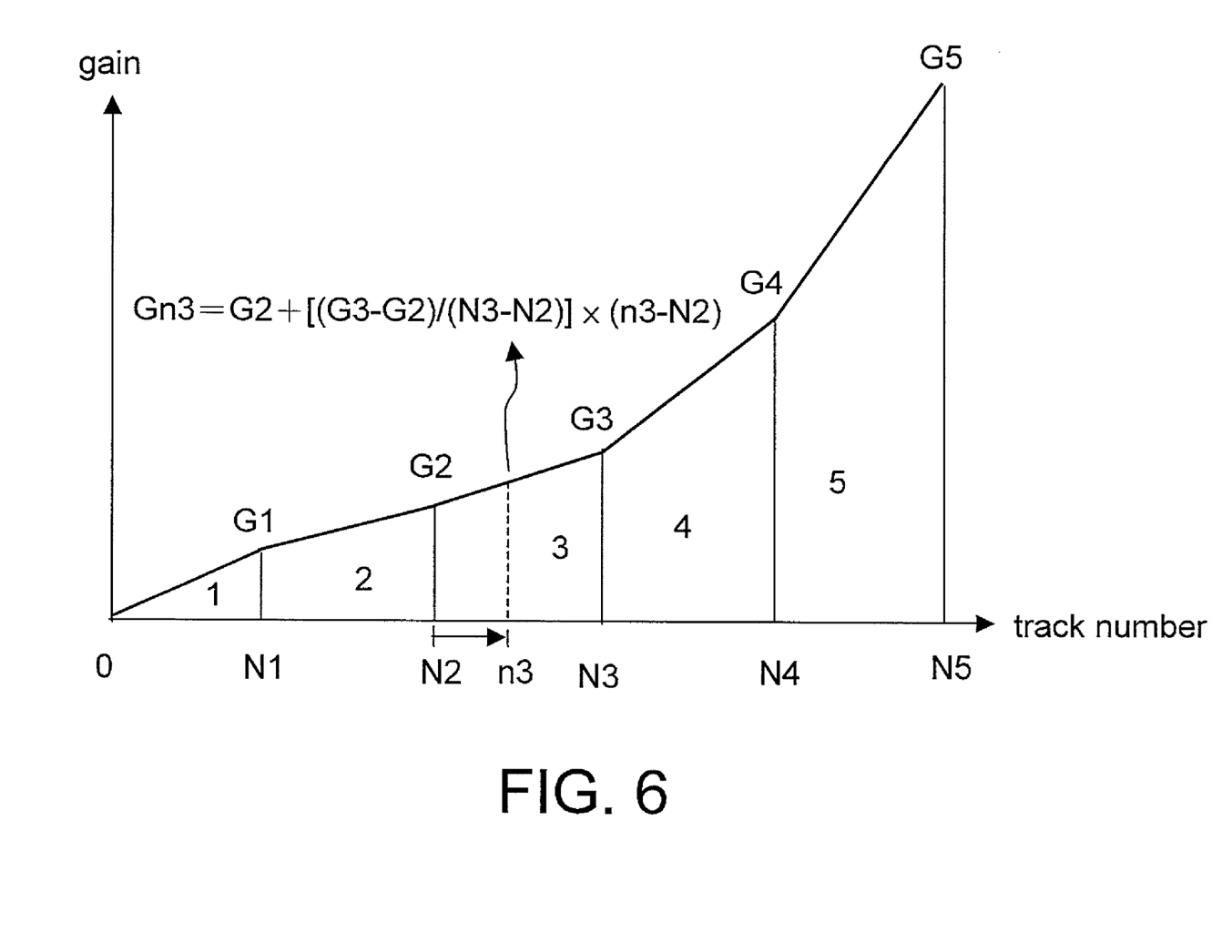
FIG. 6 shows a relationship diagram of track number vs. gain in a compensation method in the radial direction on the label side of an optical disc according to a second embodiment of the disclosure.

Referring to FIG. 6, a relationship diagram of track number vs. gain in a compensation method in the radial direction on the label side of an optical disc according to a second embodiment of the disclosure is shown. The track numbers for the demarcating data tracks of the compensation areas are respectively set as N1, N2, N3, N4 and N5, and the linearly approximated voltage compensation formula for each area is expressed as:

$$G_{nz} = G_{z-1} + [(G_z - G_{z-1})/(N_z - N_{z-1})] \times (nz - N_{z-1})$$ wherein nz denotes the track number of any track of the $z^{th}$ compensation area;

$G_{nz}$ denotes the voltage gain for the $nz^{th}$ track of the $z^{th}$ compensation area;

$G_z$ and $G_{z-1}$ respectively denote the voltage gain for at the pre-determined points before and after the $z^{th}$ compensation area.

For example, for the OPU to be moved to any track of the 3rd area, a radial-directional voltage gain Gn3 is applied to calibrate the OPU to correctly achieve the predetermined distance. The voltage gain Gn3 is obtained from the voltage compensation formula expressed as: $Gn3 = G2 + [(G3-G2)/(N3-N2)] \times (n3-N2)$, wherein n3 denotes any track number of the 3rd area. Thus, the radial-directional voltage gain of the any point of the 3rd area can be obtained, and the OPU can be more accurately moved on the label side 34 (referring to FIG. 5).

Figure 7:
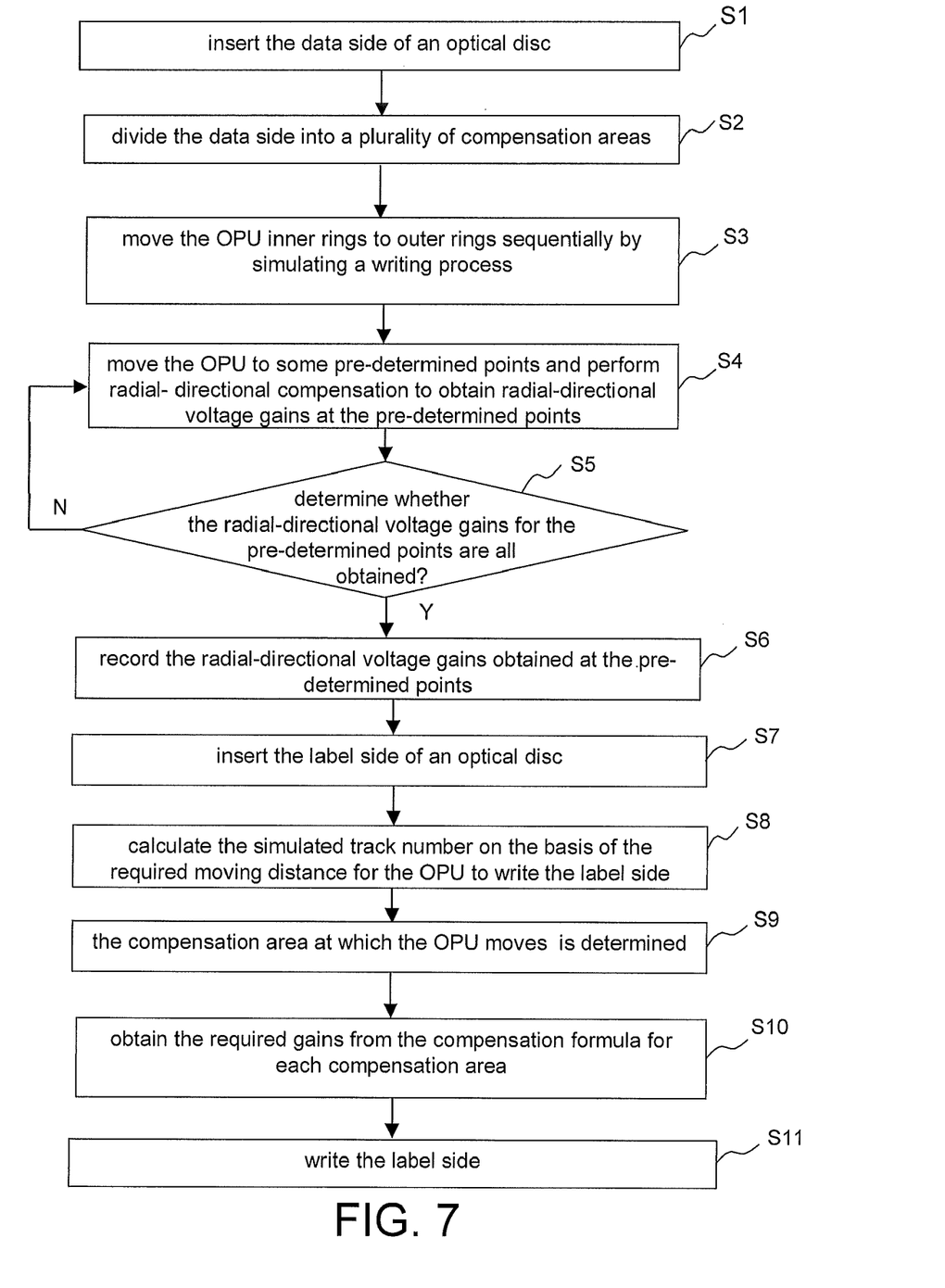
FIG. 7 shows a flowchart of a compensation method in the radial direction on the label side of an optical disc according to a second embodiment of the disclosure.

Referring to FIG. 7, a flowchart of a compensation method in the radial direction on the label side of an optical disc according to a second embodiment of the disclosure is shown.

In the present embodiment of the disclosure, the voltage for driving lens in the radial direction on the label side is compensated by a voltage compensation formula in which the data side is divided into a plurality of compensation areas, and the detailed steps are disclosed below: Firstly, the method begins at step S1, an optical disc is inserted into an optical disk drive with the data side of the optical disc facing an OPU. Next, the method proceeds to step S2, the data side of the optical disc is divided into a plurality of compensation areas. Then, the method proceeds to step S3, the OPU is moved from inner rings to outer rings sequentially by simulating a writing process. Then, the method proceeds to step S4, the OPU is moved to some pre-determined points, and radial-directional compensation is performed to obtain radial-directional voltage gains at the pre-determined points. After that, the method proceeds to step S5, whether the radial-directional voltage gains for the pre-determined points are all obtained is determined. If the radial-directional voltage gains for the pre-determined points are not yet obtained, then the method returns to step S4 to continue moving the OPU to obtain the radial-directional voltage gains at the pre-determined points. If the pre-determined number of radial-directional voltage gains is already obtained, then the method proceeds to step S6. In step S6, the radial-directional voltage gains obtained at the pre-determined points are recorded. Afterwards, the method proceeds to step S7, an optical disc is inserted into the optical disk drive with the label side of the optical disc facing the OPU. Following that, the method proceeds to step S8, the simulated track number is calculated on the basis of the required moving distance for the OPU to write pattern on the label side. Then, the method proceeds to step S9, the compensation area at which the OPU moves is determined according to the demarcating data track of the pre-determined compensation area. Then, the method proceeds to step S10, the voltage gain for compensating the radial-directional lens driving voltage is obtained from the compensation formula of the pre-determined compensation area according to the simulated track number calculated on the basis of the moving distance required by the OPU, so that the OPU can be correctly moved to write the label side. Lastly, the method proceeds to step S11, the label side is written.

According to the compensation method in the radial direction on the label side of an optical disc of the disclosure, the data side of the optical disc is divided into a plurality of compensation areas from inner rings to outer rings, and the change in the voltage gain is more accurately approximated with the gain for each compensation area, so as that the writing quality of the label side can be further improved.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A compensation method in a radial direction on a label side of an optical disc, comprising:
    (1) inserting an optical disc into an optical disk drive with a data side of the optical disc facing an optical pick-up head (OPU);
    (2) dividing the data side of the optical disc into at least one compensation area;
    (3) sequentially moving the OPU from inner rings to outer rings of the optical disc by simulating a writing process;

(4) moving the OPU to some pre-determined points of the compensation area and performing radial-directional compensation to obtain radial-directional voltage gains at the pre-determined points;
(5) recording the radial-directional voltage gain obtained at each pre-determined point;
(6) inserting an optical disc to the optical disk drive with the label side of the optical disc facing the OPU;
(7) calculating a simulated track number according to a required moving distance for the OPU to write pattern on the label side;
(8) moving the OPU by a radial-directional lens driving voltage compensated with a voltage gain obtained from a voltage compensation formula; and
(9) writing the label side of the optical disc.

2. The compensation method according to claim 1, wherein in the step (2), the data side of the optical disc is divided into a compensation area.

3. The compensation method according to claim 2, wherein the pre-determined points are inner-ring starting point and outer-ring terminal point.

4. The compensation method according to claim 1, wherein the step (4) is further followed by the following step:
(4-1) determining whether the radial-directional voltage gains are obtained at the pre-determined points: if a pre-determined number of radial-directional voltage gains is not yet obtained, then the method returns to step (4); if the pre-determined number of radial-directional voltage gains is already obtained, then the method proceeds to step (5).

5. The compensation method according to claim 4, wherein in the step (2), the data side of the optical disc is divided into a plurality of compensation areas.

6. The compensation method according to claim 5, wherein the pre-determined points are the demarcating data track for each compensation area and the last track of the optical disc.

7. The compensation method according to claim 5, wherein in the step (7), the track number of the pre-determined point is used as demarcation for determining the compensation area at which the OPU moves.

8. The compensation method according to claim 7, wherein the voltage compensation formula is expressed as:

$$G_{nz}=G_{z-1}+[(G_z-G_{z-1})/(N_z-N_{z-1})]\times(nz-N_{z-1}), \text{ wherein}$$

nz denotes the track number of any track of the $z^{th}$ compensation area;

$G_{nz}$ denotes the voltage gain for the $nz^{th}$ track of the $z^{th}$ compensation area, $G_z$ and $G_{z-1}$ respectively denote the voltage gain for at the pre-determined points before and after the $z^{th}$ compensation area;

$N_z$ and $N_{z-1}$ denote the track number of the pre-determined points before and after the $z^{th}$ compensation area.

9. The compensation method according to claim 1, wherein in the step (7), the relative track number is obtained by dividing the moving distance of the OPU by the gauge of the data side.

* * * * *